(12) United States Patent
Kebukawa

(10) Patent No.: US 12,046,961 B2
(45) Date of Patent: Jul. 23, 2024

(54) MOTOR

(71) Applicant: MINEBEA MITSUMI Inc., Nagano (JP)

(72) Inventor: Koji Kebukawa, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 158 days.

(21) Appl. No.: 17/475,631

(22) Filed: Sep. 15, 2021

(65) Prior Publication Data

US 2022/0006368 A1 Jan. 6, 2022

Related U.S. Application Data

(62) Division of application No. 16/459,713, filed on Jul. 2, 2019, now Pat. No. 11,159,075.

(30) Foreign Application Priority Data

Jul. 13, 2018 (JP) .................................. 2018-133052

(51) Int. Cl.
| | |
|---|---|
| H02K 15/02 | (2006.01) |
| H02K 3/52 | (2006.01) |
| H02K 7/04 | (2006.01) |
| H02K 15/16 | (2006.01) |

(52) U.S. Cl.
CPC ............. *H02K 15/02* (2013.01); *H02K 3/522* (2013.01); *H02K 7/04* (2013.01); *H02K 15/16* (2013.01)

(58) Field of Classification Search
CPC .......... H02K 15/02; H02K 3/522; H02K 7/04; H02K 5/16; H02K 15/16; H02K 2211/00; H02K 7/083; H02K 1/2706

USPC ................ 310/81, 90.5, 156.08, 156.1, 60 R
See application file for complete search history.

(56) References Cited

U.S. PATENT DOCUMENTS

| | | | |
|---|---|---|---|
| 3,242,459 A | 3/1966 | Mccollum | |
| 4,642,496 A | 2/1987 | Kerviel et al. | |
| 4,667,123 A | 5/1987 | Denk et al. | |
| 7,365,464 B2 | 4/2008 | Brown | |
| 11,159,075 B2 * | 10/2021 | Kebukawa | H02K 7/04 |
| 2008/0088187 A1 * | 4/2008 | Shao | H02K 11/0141 310/90 |
| 2011/0229350 A1 * | 9/2011 | He | F04D 25/0606 417/353 |

(Continued)

FOREIGN PATENT DOCUMENTS

| | | |
|---|---|---|
| CN | 101030713 A | 9/2007 |
| CN | 202663265 U | 1/2013 |

(Continued)

OTHER PUBLICATIONS

Japanese Office Action dated Oct. 19, 2020 for corresponding Japanese Application No. 2018-133052 and English translation.

(Continued)

*Primary Examiner* — Jose A Gonzalez Quinones
(74) *Attorney, Agent, or Firm* — Pearne & Gordon LLP

(57) ABSTRACT

A motor includes a shaft, at least two bearings supporting the shaft, a magnet supported by the shaft between the at least two bearings, a stator surrounding the magnet, and a magnetic member arranged between the magnet and at least one of the bearings in a longitudinal direction of the shaft. The magnetic member has a large outer diameter with respect to an outer diameter of the magnet.

19 Claims, 10 Drawing Sheets

(56) References Cited

U.S. PATENT DOCUMENTS

| | | |
|---|---|---|
| 2012/0187787 A1 | 7/2012 | Saito |
| 2012/0312259 A1 | 12/2012 | Yamanaka et al. |
| 2014/0023534 A1* | 1/2014 | Ramdane ............... F04D 29/051 |
| | | 417/420 |
| 2014/0077644 A1* | 3/2014 | Onishi ................. H02K 5/1732 |
| | | 310/90 |
| 2014/0091649 A1 | 4/2014 | Dragon et al. |
| 2014/0312727 A1* | 10/2014 | Shinosaka ............ H02K 5/1732 |
| | | 310/90 |
| 2015/0349603 A1* | 12/2015 | Parmeter ............... F04D 29/048 |
| | | 310/90 |
| 2016/0056680 A1* | 2/2016 | Tanaka .................. H02K 5/161 |
| | | 310/90 |
| 2016/0355083 A1 | 12/2016 | Kuroda et al. |
| 2018/0145575 A1 | 5/2018 | Woehl-Bruhn et al. |
| 2020/0021173 A1 | 1/2020 | Kebukawa |
| 2022/0006368 A1* | 1/2022 | Kebukawa ............. H02K 15/16 |

FOREIGN PATENT DOCUMENTS

| | | | |
|---|---|---|---|
| CN | 103107642 A | | 5/2013 |
| CN | 203261154 U | | 10/2013 |
| CN | 103516158 A | | 1/2014 |
| CN | 103776590 A | | 5/2014 |
| CN | 206111690 U | | 4/2017 |
| CN | 207442558 U | | 6/2018 |
| DE | 10 2015 110 267 A1 | | 12/2016 |
| JP | 35-30215 Y | | 11/1960 |
| JP | S54-149601 U | | 10/1979 |
| JP | 55-043360 U | | 9/1980 |
| JP | 59-183154 U | | 12/1984 |
| JP | 62-092759 A | | 4/1987 |
| JP | H09-009556 A | | 1/1997 |
| JP | H10-080080 A | | 3/1998 |
| JP | 2005-176530 A | | 6/2005 |
| JP | 2005-223980 A | | 8/2005 |
| JP | 2008-289283 A | | 11/2008 |
| JP | 2012-039732 A | | 2/2012 |
| JP | 2012039732 A | * | 2/2012 |
| JP | 2012-157087 A | | 8/2012 |
| JP | 2015-104224 A | | 6/2015 |
| WO | WO-2016207024 A1 | * | 12/2016 ............. B24B 23/04 |
| WO | 2017/130565 A1 | | 8/2017 |

OTHER PUBLICATIONS

Japanese Office Action dated Feb. 8, 2021 for corresponding Japanese Application No. 2018-133052 and English translation.
Decision to Grant dated Apr. 19, 2021 for corresponding Japanese Application No. 2018-133052 and English translation.
Japanese Office Action dated Aug. 1, 2023 for corresponding Japanese Application No. 2022-139020 and English translation.
First Office Action dated Mar. 18, 2024 for corresponding Chinese Application No. 201910628116.2 and English translation.

* cited by examiner

| RB0[-] | ML0[mN-m] |
|---:|---:|
| 1.5 | 0.6961 |
| 2.2 | 0.6408 |
| 2.8 | 0.3913 |
| 3.5 | 0.3621 |

FIG.7

| RB1,RB2 [-] | ML [mN-m] | TR [-] |
|---|---|---|
| - | 0.64 | 1 |
| 0 | 0.24 | 0.95 |
| 0.5 | 0.26 | 0.96 |
| 1 | 0.29 | 0.99 |
| 1.5 | 0.32 | 1 |
| 2 | 0.33 | 1.01 |
| 2.5 | 0.31 | 1.02 |
| 3 | 0.32 | 1.01 |
| 3.5 | 0.31 | 1.01 |

FIG.9

MOTOR

CROSS REFERENCE TO RELATED APPLICATIONS

This application is a Continuation of U.S. application Ser. No. 16/459,713 filed on Jul. 2, 2019, which claims the benefit of Japanese Patent Application No. 2018-133052, filed Jul. 13, 2018. The above-noted applications are incorporated by reference herein.

BACKGROUND

Technical Field

The present disclosure relates to a motor.

Background

A motor comprising a stator having a stator core wound by a coil, a rotor having a rotor core to which a rotation shaft is fixed and a permanent magnet embedded in a peripheral portion of the rotor core, and a pair of balance rings inserted to be fixed on both sides of the rotor core on the rotation shaft has been known (see Japanese Patent Application Laid-Open No. 2012-39732).

Additionally, a motor is desired to rotate a rotor with a rapid speed of 50000 rpm, for example, in accordance with use of the motor. When the motor is rapidly rotated, for example, it is desirable to decrease the outer diameter of a magnet to be assembled to the rotor to make a centrifugal force occurring in rotation of the rotor small.

However, including the motor disclosed in Japanese Patent Application Laid-Open No. 2012-39732, it has been difficult for the conventional motors to achieve a rapid rotation due to the following factors.

First, in the conventional motors, since a magnetic metal such as iron is included in a material of a bearing, a part of magnetic flux occurring from a magnet of a rotating rotor may move in a direction of an outer ring of the bearing as leakage magnetic flux. In the conventional motors, due to this leakage magnetic flux moving in the direction of the outer ring of the bearing, the eddy current may be generated at the bearing. In the conventional motors, due to this eddy current, braking is applied to the bearing and may be a resistance to a rotating force of the rotor.

Further, to rotate the motor rapidly, it is necessary to secure a balance of the rotor with high precision. Generally, an operation to achieve a balance of the rotor is made by attaching a balance member to a shaft, and then reducing the weight of the balance member by cutting work, etc. However, in the conventional motors, an operation of a cutting tool needs to be carefully performed when the distance in the axis direction between a magnet and the balance member is short, etc. As a result, processing to reduce the mass of the balance member assembled to the rotor has been difficult.

The present disclosure is related to providing a motor which achieves a rapid rotation.

SUMMARY

In accordance with one aspect of the present disclosure, a motor according to the present disclosure includes a shaft; at least two bearings supporting the shaft; a magnet supported by the shaft between the at least two bearings; a stator surrounding the magnet; and a magnetic member arranged between the magnet and at least one of the bearings in a longitudinal direction of the shaft, wherein the magnetic member has a large outer diameter with respect to an outer diameter of the magnet.

In accordance with a motor related to one aspect of the present disclosure, the magnetic member has a small outer diameter with respect to an outer diameter of each bearing.

In accordance with a motor related to one aspect of the present disclosure, in a longitudinal direction of the shaft, the distance between each bearing and the magnetic member is shorter than the distance between the magnetic member and the magnet.

In accordance with a motor related to one aspect of the present disclosure, the magnetic member is separated from each bearing and the magnet, respectively, by a predetermined distance in the longitudinal direction of the shaft.

In accordance with a motor related to one aspect of the present disclosure, a rotor including the shaft and the magnet is included, wherein the magnetic member is a balance member of the rotor.

In accordance with a motor related to one aspect of the present disclosure, in the longitudinal direction of the shaft, the magnetic member includes a surface portion facing each bearing, and a recessed part, a hole portion or a protruding part is provided at a surface portion facing the bearing.

In accordance with a motor related to one aspect of the present disclosure, in the longitudinal direction of the shaft, the distance between the magnet and the magnetic member is longer than a distance of air gap.

In accordance with a motor related to one aspect of the present disclosure, a plurality of bearings including the two bearings is included, wherein the magnetic member is provided for each of the plurality of bearings.

In accordance with a motor related to the present disclosure, a rapid rotation can be achieved.

BRIEF DESCRIPTION OF THE DRAWINGS

FIG. 7 is a table showing the relationship between a mechanical load and a ratio of the distance between a magnet and a bearing to air gap in the motor shown in FIG. 1.

FIG. 9 is a table showing the relationship among the distance between the magnet and the balance member to air gap, the mechanical load, and a ratio of torque of the motor shown in FIG. 1 to torque of a motor not including a balance member in the motor shown in FIG. 1.

DETAILED DESCRIPTION

Hereinafter, a motor related to the embodiment of the present disclosure will be described with reference to the accompanying drawings.

[General Configuration of Motor]

The general configuration of a motor according to one embodiment of the present disclosure will be described.

Figure 1:
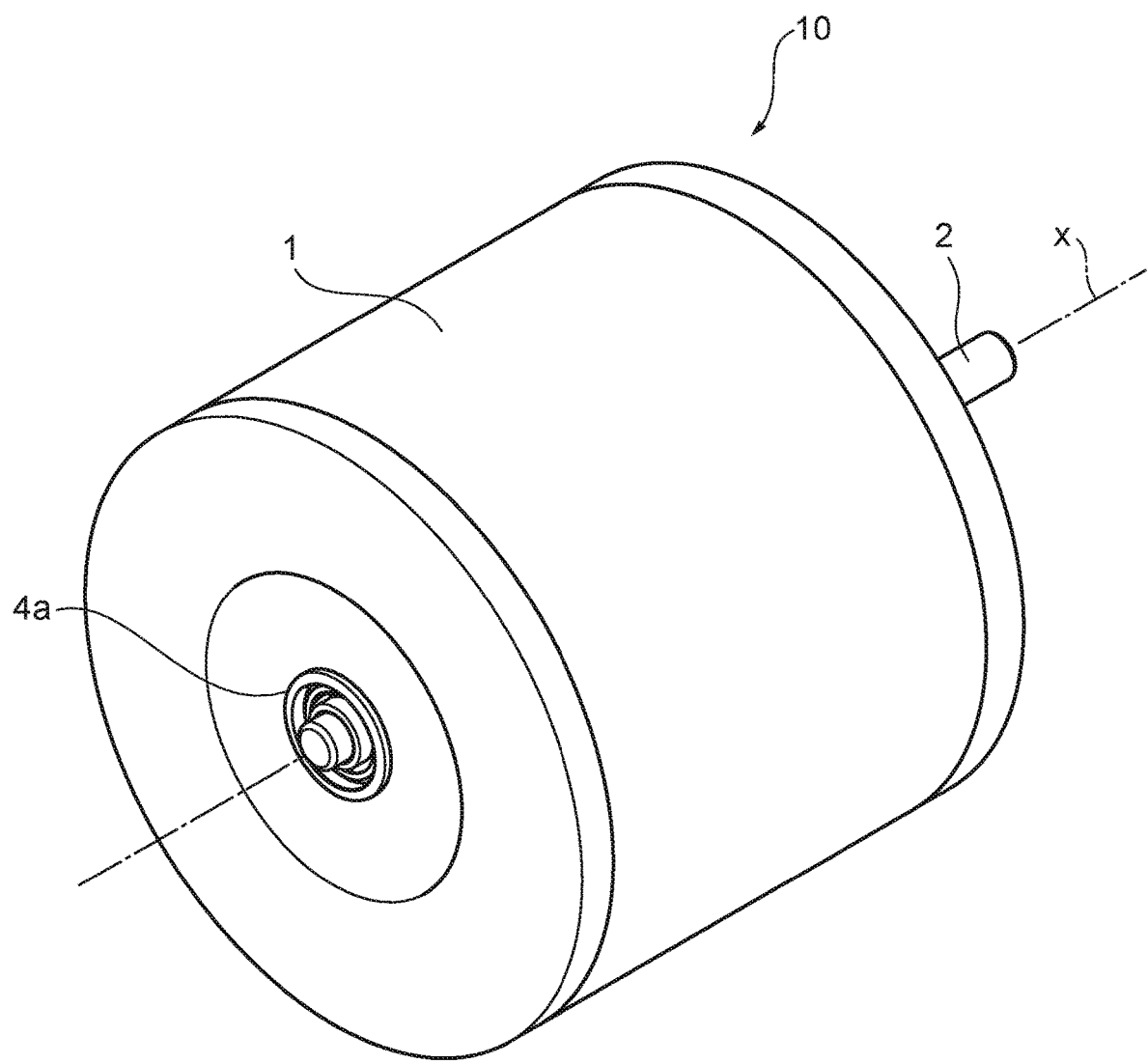
FIG. 1 is a perspective view schematically showing the configuration of a motor according to an embodiment of the present disclosure.
Figure 2:
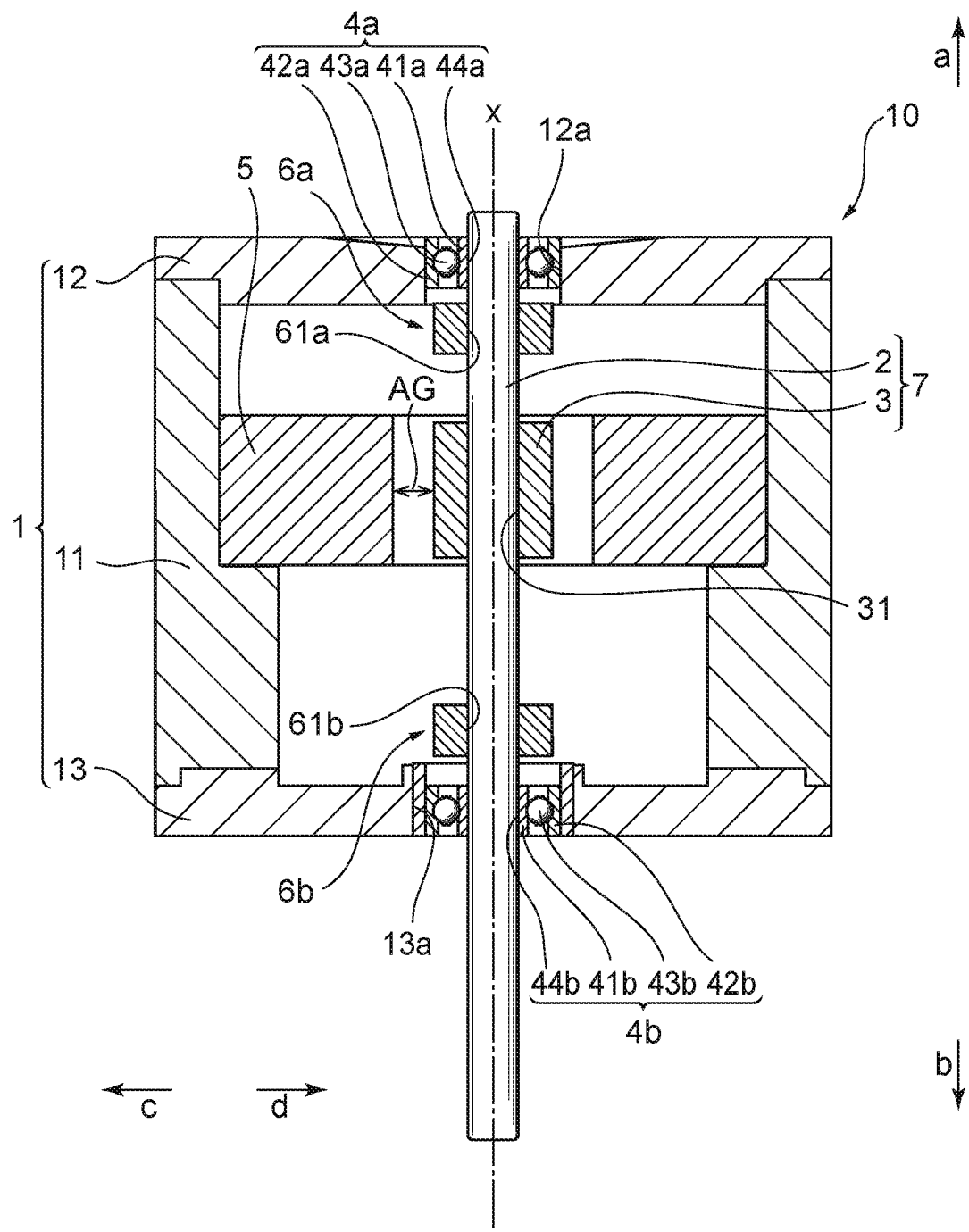
FIG. 2 is a cross-sectional view along the axis of the motor shown in FIG. 1.

FIG. 1 is a perspective view schematically showing the configuration of a motor 10 according to the embodiment of the present disclosure. FIG. 2 is a cross-sectional view along an axis x of the motor 10.

In the following explanation, for convenience, a direction which is perpendicular to the direction of the axis x shown in FIG. 1 (hereinafter, the direction is also referred to as "a radial direction") is defined as the front of the motor 10. Also, in the following explanation, for convenience, in a direction of the axis x in FIG. 2, the direction of an arrow a is defined as an upper side a, and the direction of an arrow b is defined as a lower side b. Also, in a radial direction, a direction away from the axis x (the direction of an arrow c of FIG. 2) is defined as an outer periphery side c, and a direction toward the axis x (the direction of an arrow d of FIG. 2) is defined as an inner periphery side d.

The motor 10 comprises a shaft 2, at least two bearings 4a and 4b supporting the shaft 2, a magnet 3 supported by the shaft 2 to rotate together with the shaft 2, and a stator 5 surrounding the magnet 3. Also, the motor 10 has balance members 6a and 6b as a magnetic member. The balance members 6a and 6b are arranged between the magnet 3 and at least one of the bearings 4a and 4b in a longitudinal direction of the shaft 2 to rotate together with the shaft 2, and have a larger outer diameter than an outer diameter of the magnet 3. Hereinafter, the configuration of the motor 10 will be concretely explained.

A case 1 defines the general shape of the motor 10 and houses the above components of the motor 10. The case 1 comprises a case main body 11 formed as a hollow cylinder having open upper and lower lid portions, an upper lid portion 12 attached to a lid portion of the upper side a (the side of one end portion) of the case main body 11 and a lower lid portion 13 attached to a lid portion of the lower side b (the side of another end portion) of the case main body 11.

The upper lid portion 12 has the substantially disc shape corresponding to the shape of a lid surface of the case main body 11 to cover the case main body 11 from the upper side a. Also, the upper lid portion 12 is formed with a bearing retention hole 12a as a hole for retaining the bearing 4a penetrated by the shaft 2. The lower lid 13 has the substantially disc shape corresponding to the shape of a lid surface of the case main body 11 to cover the case main body 11 from the lower side b. Also, the lower lid portion 13 is formed with a bearing retention hole 13a as a hole for retaining the bearing 4b penetrated by the shaft 2 penetrates.

The shaft 2 is, for example, a member of a round bar defining the axis x direction as a longitudinal direction, the axis x direction being the extension direction of the shaft 2 (longitudinally). The shaft 2 rotates around the axis x direction. The shaft 2 is supported by the bearing retention holes 12a, 13a of the case 1 via the bearings 4a, 4b. Tip portions of the shaft 2 (one end portion) are exposed to the outer side of the case 1 from the bearing retention holes 12a, 13a. In the tip portions of the shaft 2, a portion exposed from the direction of the lower side b (the other portion) becomes an output shaft to transfer a rotational force generated by the motor 10 to the outside.

The magnet 3 has, for example, the general shape of a cylinder. The magnet 3 is formed with a shaft penetration hole 31 as a penetration hole for penetrating the center of the magnet 3 defining the axis x direction as a longitudinal direction. The magnet 3 is supported by the shaft 2 at a portion between the bearing 4a and the bearing 4b within the case 1. The magnet 3 supported by the shaft 2 rotates together with the shaft 2. The shaft 2 and the magnet 3 constitute a rotor 7 in the motor 10.

The bearing 4a is attached to the upper lid portion 12 on the upper side a of the case 1. The bearing 4b is attached to the lower lid portion 13 on the lower side b of the case 1. The bearings 4a, 4b are, for example, a ball bearing. In the present disclosure, the kind of the bearing is not especially limited. The bearings 4a, 4b are respectively constituted by inner rings 41a, 41b and outer rings 42a, 42b arranged such that the axis x direction is defined as the center axis, and rolling elements 43a, 43b provided between the inner rings 41a, 41b and outer rings 42a, 42b. The bearings 4a, 4b respectively support the shaft 2 by inner peripheral surfaces 44a, 44b of the inner rings 41a, 41b.

The bearings 4a, 4b support the shaft 2 rotatably at any portion in the axis x direction of the shaft 2. More specifically, the bearing 4a supports a portion on the upper side a in the axis x direction of the shaft 2 rotatably by inserting the shaft 2 into the inner peripheral surface 44a. The bearing 4b supports a portion on the lower side b in the axis x direction of the shaft 2 rotatably by inserting the shaft 2 into the inner peripheral surface 44b. In the bearings 4a, 4b, all the inner rings 41a, 41b, the outer rings 42a, 42b and rolling elements 43a, 43b are made of metal with magnetic property, generally, formed using alloy including iron. The bearings 4a, 4b have a larger outer diameter of the outer rings 42a, 42b than an outer diameter of the magnet 3 in the radial direction. That is, in the bearings 4a, 4b, the outer rings 42a, 42b are arranged outside of the outer periphery of the magnet 3 in a radial direction.

The stator 5 is retained at an inner peripheral surface of the case main body 11. Concretely, the stator 5 is arranged at a position corresponding to the magnet 3 in the axis x direction (a longitudinal direction of the shaft 2) within the case 11 and at a position farther away from the shaft 2 than the magnet 3 in the radial direction. The stator 5 is constituted by a stator core formed to be annular to surround the magnet 3, a coil wound around an extending portion which extends from the stator core to the inner peripheral side d, and an insulator which insulates the stator core from the coil. The stator 5 is arranged such that an annular inner peripheral surface of the stator core surrounds the magnet 3. An air gap AG is formed between the inner peripheral surface of the stator core and an outer peripheral surface of the magnet 3.

Additionally, the shapes of the shaft 2, the magnet 3, the bearings 4a, 4b and the stator 5 are not limited to the above examples as long as rotation movement of the rotor 7 in the motor 10 is allowed.

The balance member 6a is arranged between the magnet 3 and the bearing 4a in the axis x direction of the shaft 2. The balance member 6b is arranged between the magnet 3 and the bearing 4b in the axis x direction of the shaft 2. The balance members 6a, 6b respectively have penetration holes 61a, 61b penetrating at the center defining the axis x direction as a longitudinal direction. The balance members 6a, 6b are provided, for example, corresponding to the number of the bearings 4a, 4b. The balance members 6a, 6b rotate around the axis x together with the rotor 7, that is, the shaft 2 and the magnet 3. The balance members 6a, 6b serve as a balancer to prevent an eccentric motion when the rotor 7 rotates around the axis x.

The balance members 6a, 6b are formed from a magnetic member having a relatively high specific gravity, for example, a Fe—Cu based sintered member. That is, the balance members 6a, 6b serve as a path allowing passage of magnetic flux.

Figure 3:
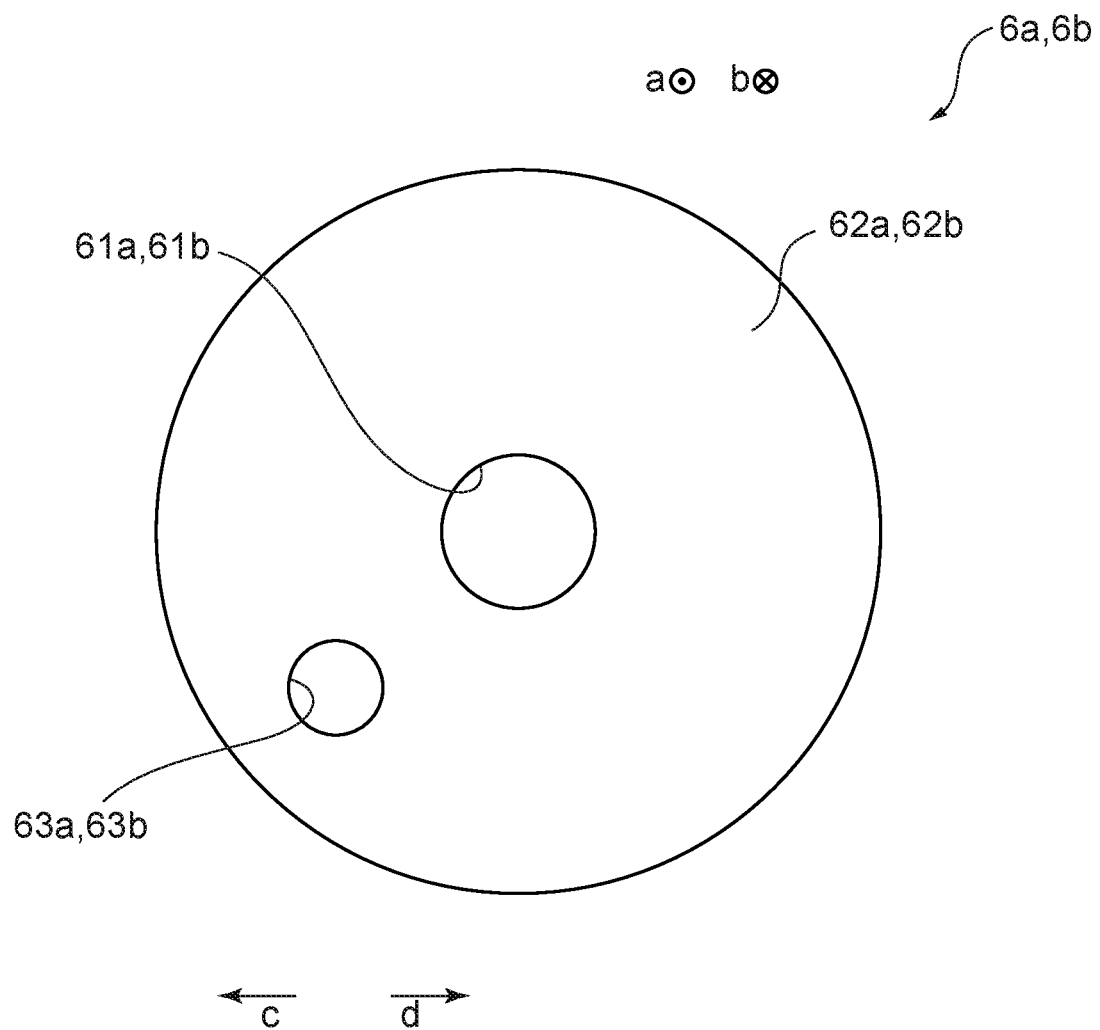
FIG. 3 is a plan view schematically showing the configuration of a balance member of the motor shown in FIG. 1.
Figure 4:
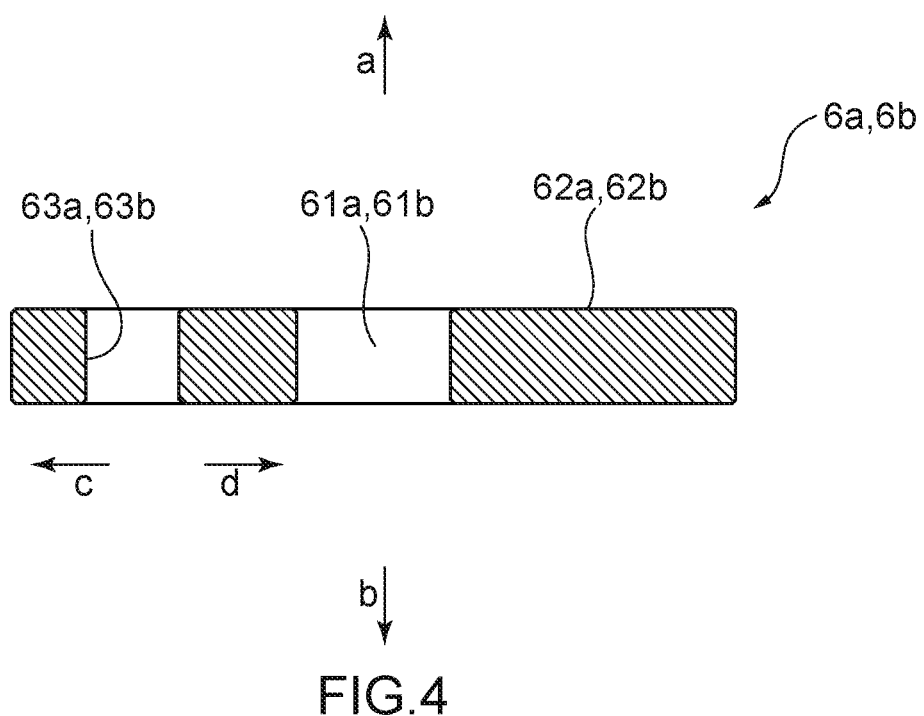
FIG. 4 is a cross-sectional view schematically showing the configuration of the balance member of the motor shown in FIG. 1.

FIG. 3 is a plan view schematically showing the configuration of the balance members 6a, 6b of the motor 10. FIG. 4 is a cross-sectional view schematically showing the configuration of the balance members 6a, 6b of the motor 10. As shown in FIGS. 3 and 4, in the balance members 6a, 6b, on surface portions 62a, 62b, the above penetration holes 61a, 61b and hole portions 63a, 63b penetrating in the axis x direction are formed. The hole portions 63a, 63b serve as a mass adjustment portion to prevent eccentricity when the balance members 6a, 6b rotate together with the rotor 7.

The hole portions 63a, 63b are formed by cutting work using a cutting tool such as a drill on the surface portions 62a, 62b of the balance members 6a, 6b from one to another of the upper side a and the lower side b. The surface portions 62a, 62b form surfaces facing the bearings 4a, 4b in the axis x direction of the shaft 2. The hole portions 63a, 63b can be provided at a predetermined position on the surface portions 62a, 62b after the balance members 6a, 6b are assembled to the shaft 2 together with the magnet 3. The forming position of the hole portions 63a, 63b on the surface portions 62a, 62b is determined considering a balance of the center of gravity in a radial direction of the rotor 7 to prevent an eccentric motion when the rotor 7 rotates.

Figure 5A:
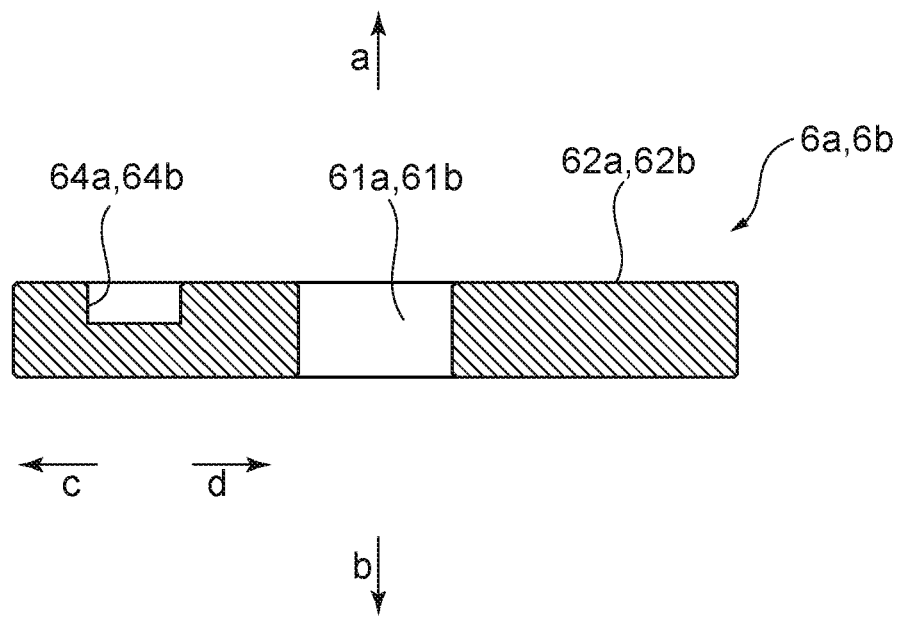
FIG. 5A is a cross-sectional view schematically showing a variant of the balance member of the motor shown in FIG. 1.
Figure 5B:
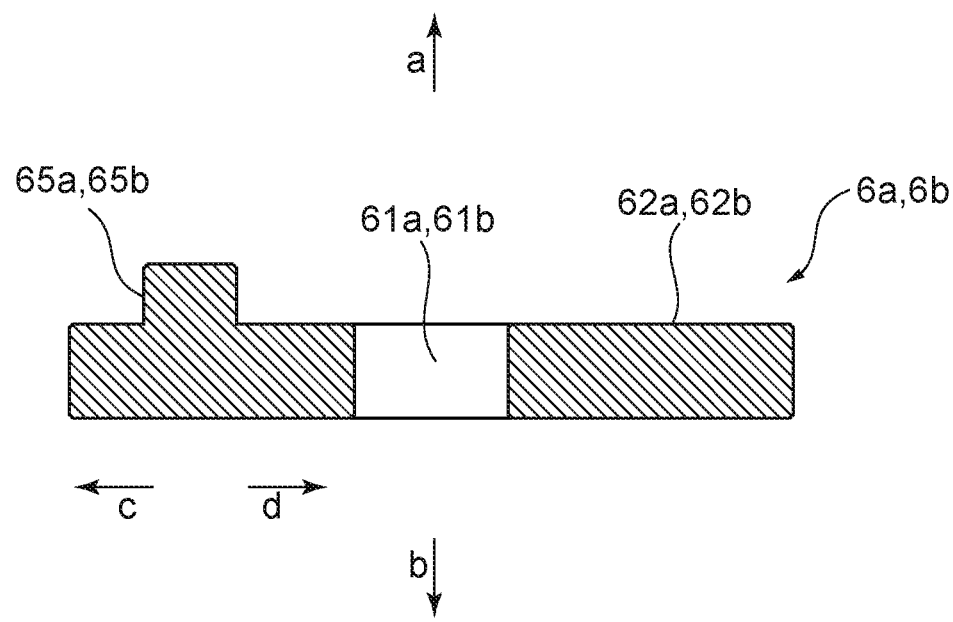
FIG. 5B is a cross-sectional view schematically showing another variant of the balance member of the motor shown in FIG. 1.

Additionally, while the hole portions 63a, 63b penetrating in the axis x direction of the balance members 6a, 6b are shown as an example of the mass adjustment portion of the present disclosure in the above explanation, the shape of the mass adjustment portion and the position of the mass adjustment portion of the surface portions 62a, 62b in the present disclosure is not limited to the above example. FIG. 5 is a cross-sectional view schematically showing a variant of the balance members 6a, 6b of a motor 20. As shown in FIG. 5, the mass adjustment portion may be recessed parts 64a, 64b (see FIG. 5A) or protruding parts 65a, 65b (see FIG. 5B) formed on a surface facing the upper side a or the lower side b of the balance members 6a, 6b, not a penetration hole such as the hole portions 63a, 63b shown in FIGS. 3 and 4. Also, the shape of the holes in the mass adjustment portion is not limited to the above example.

[Dimension and Arrangement of Magnet, Bearing or Balance Member]

Figure 6:
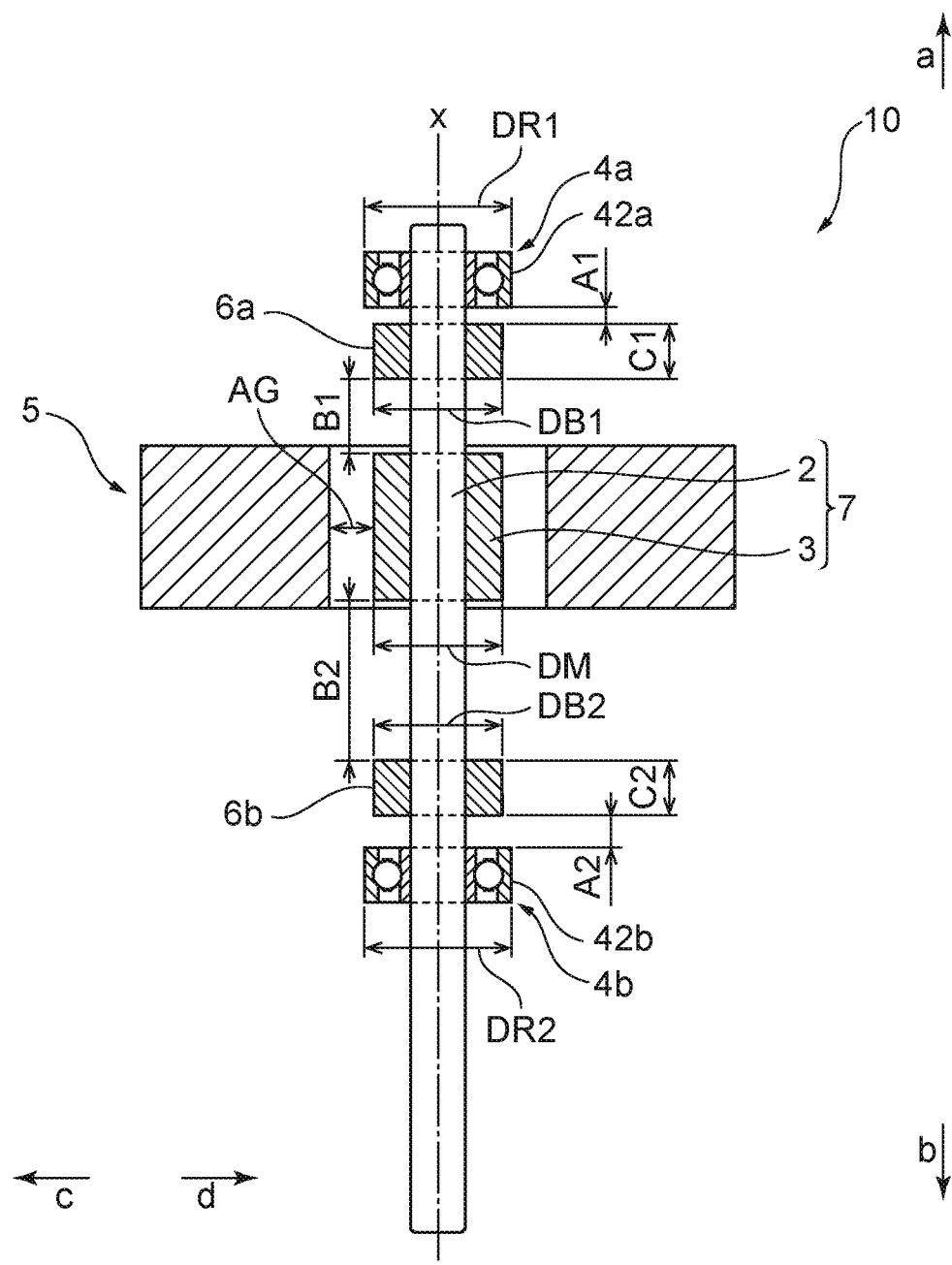
FIG. 6 is a cross-sectional view along the axis of the motor shown in FIG. 1 for explaining the size and an arrangement of a shaft, a bearing and the balance member.

Next, with reference to FIG. 6, the dimension and arrangement of the magnet 3, the bearings 4a, 4b and the balance members 6a, 6b in the motor 10 will be explained. FIG. 6 is a cross-sectional view of a cross section along the axis x direction of the motor 10 of FIG. 1, and a schematic diagram for explaining the dimension and the arrangement of the magnet 3, the bearings 4a, 4b and the balance members 6a, 6b.

As shown in FIG. 6, the balance member 6a is arranged between the magnet 3 and the bearing 4a in the axis x direction of the shaft 2. Also, the balance member 6b is arranged between the magnet 3 and the bearing 4b in the axis x direction of the shaft 2.

An outer diameter DB1 of the balance member 6a is larger than an outer diameter DM of the magnet 3, and smaller than an outer diameter DR1 of the outer ring 42a of the bearing 4a. The relationship among the outer diameter DB1 of the balance member 6a, the outer diameter DM of the magnet 3 and the outer diameter DR1 of the outer ring 42a of the bearing 4a is as in the following formula (1).

$$DM < DB1 < DR1 \tag{1}$$

An outer diameter DB2 of the balance member 6b is larger than the outer diameter DM of the magnet 3, and smaller than an outer diameter DR2 of the outer ring 42b of the bearing 4b. The relationship among the outer diameter DB2 of the balance member 6b, the outer diameter DM of the magnet 3 and the outer diameter DR2 of the outer ring 42b of the bearing 4b is as in the following formula (2).

$$DM < DB2 < DR2 \tag{2}$$

Additionally, the dimension of the outer diameter DB1 and the outer diameter DB2 may be the same value or different values as long as the relationship of the above formula (1) and formula (2) are maintained. In the same manner, the dimension of the outer diameter DR1 and the outer diameter of DR2 may be the same value or different values as long as the relationship of the above formula (1) and formula (2) are maintained.

The balance members 6a, 6b, constituted by a magnetic body and rotating together with the shaft 2 can reduce variation of the magnetic flux density from the magnet 3 passing through the bearings 4a, 4b in order to decrease the entry of the magnetic flux into the bearings 4a, 4b from the magnet 3. Decreasing the entry of the magnetic flux prevents occurrence of the eddy current at the outer rings 42a, 42b of the bearings 4a, 4b. Especially, in the balance members 6a, 6b, since the outer diameters DB1, DB2 have the relationship of the above formula (1) and formula (2), leakage magnetic flux from the magnet 3 to magnetic members other than the stator 5 is prevented from moving to the bearings 4a, 4b. That is, the balance members 6a, 6b prevent application of a braking force to the shaft 2 via the magnet 3 due to a magnetic force generated by the eddy current occurring at the outer rings 42a, 42b of the bearings 4a, 4b.

Additionally, the eddy current occurring at the bearings 4a, 4b is decreased as the distance from the magnet 3 to the bearings 4a, 4b increases. However, a longer distance from a fulcrum (the bearings 4a, 4b) to the center of rotation movement (the magnet 3) makes wobbling of the rotor 7 larger due to a centrifugal force generated by the rotation movement. Accordingly, in the motor 10, it is effective for achieving a rapid rotation of the motor to prevent wobbling of the motor 10 due to a centrifugal force while reducing leakage magnetic flux entering the bearings 4a, 4b by the balance members 6a, 6b made by the magnetic member described above.

The balance member 6a is separated from the bearing 4a by a predetermined distance A1 in the axis x direction of the shaft 2. Also, the balance member 6a is separated from the magnet 3 by a predetermined distance B1 in the axis x direction of the shaft 2. The balance member 6b is separated from the bearing 4b by a predetermined distance A2 in the axis x direction of the shaft 2. Also, the balance member 6b is separated from the magnet 3 by a predetermined distance B2 in the axis x direction of the shaft 2.

Here, the distance A1 between the balance member 6a and the bearing 4a is shorter than the distance B1 between the balance member 6a and the magnet 3 in the axis x direction of the shaft 2. The relationship between the distance A1 from the balance member 6a to the bearing 4a and the distance B1 from the balance member 6a to the magnet 3 is as in the following formula (3).

$$A1<B1 \tag{3}$$

Also, the distance A2 between the balance member 6b and the bearing 4b is shorter than the distance B2 between the balance member 6b and the magnet 3 in the axis x direction of the shaft 2. The relationship between the distance A2 from the balance member 6b and the bearing 4b and the distance B2 from the balance member 6b and the magnet 3 is as in the following formula (4).

$$A2<B2 \tag{4}$$

Additionally, the distance A1 and the distance A2 may be the same distance or different distances. In the same manner, the distance B1 and the distance B2 may be the same distance or different distances.

As described above, the balance members 6a, 6b constituted by a magnetic body are arranged to be closer to the bearings 4a, 4b than the magnet 3 to prevent occurrence of leakage magnetic flux from the magnet 3 toward the bearings 4a, 4b. That is, the balance members 6a, 6b are arranged to be closer to the bearings 4a, 4b than the magnet 3 to prevent application of braking to the bearings 4a, 4b more reliably.

In the motor 10, the respective distances B1, B2 between the magnet 3 and the balance members 6a, 6b are preferably longer than the air gap AG. In this way, because the distances B1, B2 are longer than the air gap AG, the motor 10 can have a magnetic path which is a path from the magnet 3 toward the stator 5, thus reducing leakage magnetic flux and improving magnetic efficiency. Also, because the distances B1, B2 are longer than the air gap AG, leakage magnetic flux can be reduced, so that the motor 10 can prevent application of braking due to the eddy current to the bearings 4a, 4b.

Also, as shown in FIG. 3, in the motor 10, the hole portions 63a, 63b as the mass adjustment portion to prevent eccentric motion of the rotor 7 by adjusting the mass of the balance members 6a, 6b are formed on the surface portions 62a, 62b facing away from each other in the axis x direction of the balance members 6a, 6b.

To adjust the mass of the balance members 6a, 6b, when cutting work of the surface portions 62a, 62b are performed from the axis x direction, if the balance members 6a, 6b are closely adjacent to other members in the axis x direction, the other members could be cut incorrectly. In this case, precise control of the diameter or the feed amount of a cutting tool is needed to prevent that the cutting tool may penetrate through the balance members 6a, 6b.

Also, when the surface portions 62a, 62b of the balance members 6a, 6b are difficult to be cut, cutting of a side surface of the balance members 6a, 6b is contemplated. However, cutting the side surface of the balance members 6a, 6b is difficult because the balance members 6a, 6b are thin and flat members. Also, in this case, because shavings etc. fall out from the side surface, a moment when the shaft 2 rotates may become large, and a load when the rotor 7 rotates could increase.

In the motor 10, the balance members 6a, 6b are respectively separated from the magnet 3 by predetermined distances B1, B2 as well as from the bearings 4a, 4b by predetermined distances A1, A2 in the axis x direction of the shaft 2. Due to this, according to the motor 10, in cutting work for adjustment of the mass of the balance members 6a, 6b when balance adjustment is performed, an operation of the cutting tool can be easily performed. That is, according to the motor 10, cutting work for adjustment of the mass of the balance members 6a, 6b when balance adjustment is performed can be easily performed.

[Review of Ratio of the Distance Between Magnet and Balance Member to Air Gap]

With reference to FIGS. 7 to 10, a review will be made about respective ratios RB1, RB2 of the distances B1, B2 between the magnet 3 and the balance members 6a, 6b to the air gap AG in the motor 10.

First, in the motor 10, to determine ratios RB1, RB2 of the distances B1, B2 to the air gap AG, respective ratios RB0a, RB0b of the distance between the magnet 3 and the bearings 4a, 4b to the air gap AG are varied. Moreover, in the motor 10, the variation of a mechanical load ML by varying RB0a, RB0b is reviewed. The mechanical load is a load at an inner portion of the motor occurring when the motor is rotated in a non-energized state. The mechanical load mainly includes a friction load and a magnetic load. The friction load is generated by a friction occurring between the rolling element of a bearing and a retainer when the motor rotates or a friction by grease within the motor, etc. The magnetic load is generated by a suction power (cogging) between the magnet and the stator when the motor rotates, etc.

Figure 8:
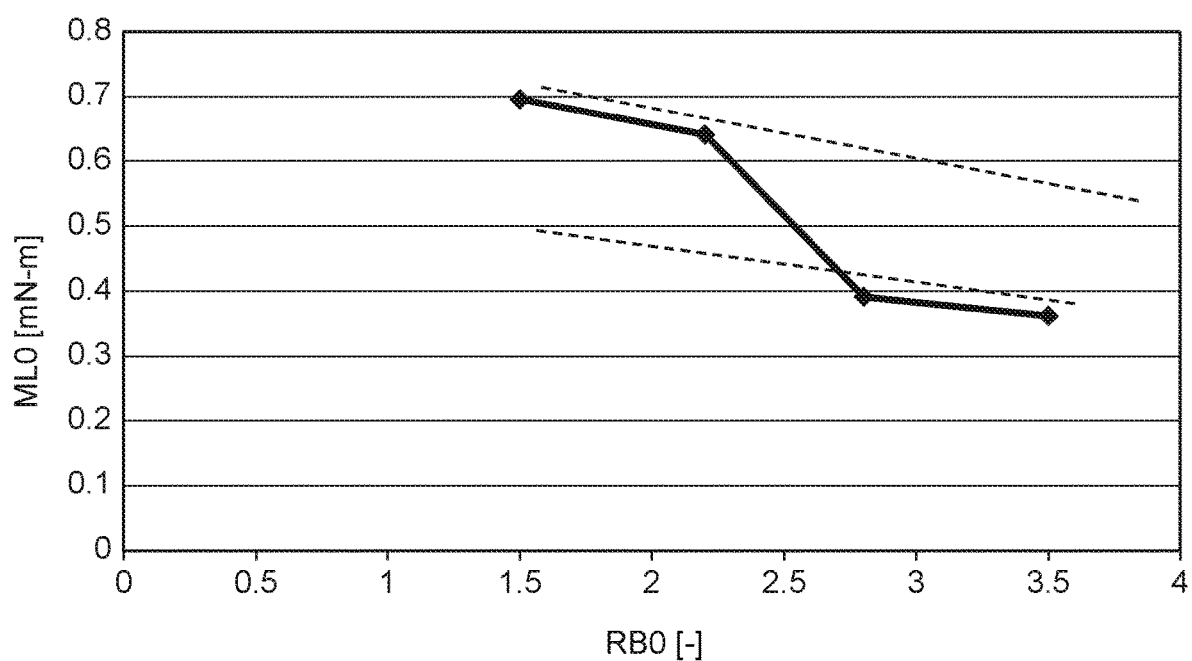
FIG. 8 is a graph showing the relationship between the mechanical load and a ratio of the distance between the magnet and the bearing to air gap in the motor shown in FIG. 1.

FIG. 7 is a table showing the relationship between the mechanical load ML and respective ratios RB0a (A1+B1+C1/AG), RB0b (A2+B2+C2/AG) of the distance (A1+B1+C1), (A2+B2+C2) between the magnet 3 and the bearings 4a, 4b to the air gap AG in the motor 10. FIG. 8 is a graph showing the relationship between the mechanical load ML and respective ratios RB0a (A1+B1+C1/AG), RB0b (A2+B2+C2/AG) of the distance (A1+B1+C1), (A2+B2+C2) between the magnet 3 and the bearings 4a, 4b to the air gap AG in the motor 10.

In FIGS. 7 and 8, the respective ratios RB0a, RB0b of the distance between the magnet 3 and the bearings 4a, 4b to the air gap AG shows a ratio of the distance between the magnet 3 and the bearings 4a, 4b assuming that the air gap AG is 1. Also, as shown in FIGS. 7 and 8, respective ratios RB0a, RB0b of the distance between the magnet 3 and the bearings 4a, 4b to the air gap AG are varied from 1.5, 2.2, 2.8 to 3.5 to measure the mechanical load ML in these cases.

According to FIGS. 7 and 8, it is found that, in the motor 10, in a case where the respective ratios RB0a, RB0b of the distance between the magnet 3 and the bearings 4a, 4b to the air gap AG is from 2.2 to 2.8, the degree of decrease of the mechanical load ML is large compared to the cases before and after this case.

Next, in the motor 10, respective ratios RB1, RB2 of the distances B1, B2 to the air gap AG will be reviewed. In the following explanation, a motor which does not include the balance members 6a, 6b is referred to as a motor of a reference example. The respective ratios RB1, RB2 of the distances B1, B2 to the air gap AG will be reviewed based on the mechanical load ML of the motor 10, a mechanical load ML2 of a motor not including the balance members 6a, 6b, and a ratio TR of torque of the motor 10 to torque of the motor not including the balance members 6a, 6b.

Figure 10:
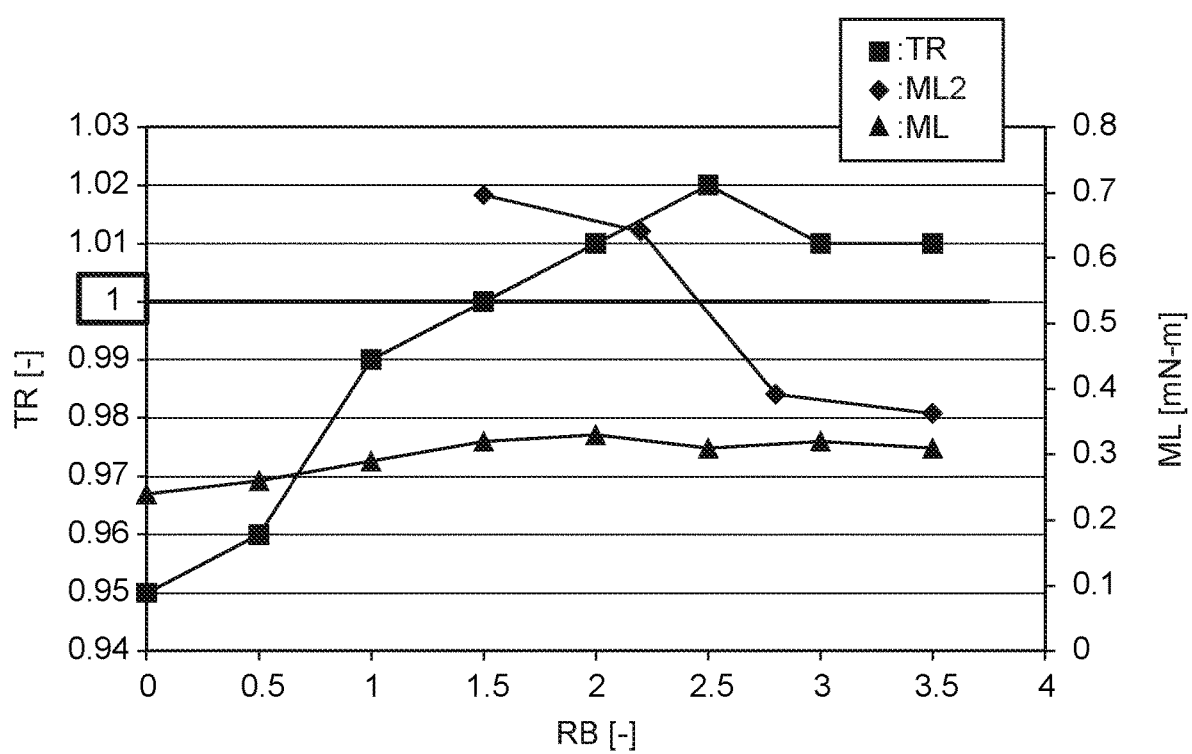
FIG. 10 is a graph showing the relationship among the distance between the magnet and the balance member to air gap, the mechanical load, and a ratio of torque of the motor described above to torque of a motor not including a balance member in the motor shown in FIG. 1.

FIG. 9 is a table showing the relationship among respective ratios RB1 (B1/AG), RB2 (B2/AG) of the distances B1, B2 between the magnet 3 and the balance members 6a, 6b to the air gap AG, the mechanical load ML, the mechanical load ML2, and a ratio TR of torque of the motor 10 to torque of the motor of the reference example in the motor 10. FIG. 10 is a graph showing the relationship among respective ratios RB1 (B1/AG), RB2 (B2/AG) of the distance B1, B2 between the magnet 3 and the balance members 6*a*, 6*b* to the air gap AG, the mechanical load ML, the mechanical load ML2, and a ratio TR of torque of the motor 10 to torque of the motor of the reference example in the motor 10. Since the balance members 6*a* 6*b* are not included, in the motor of the reference example, variation of the mechanical load ML2 is in accordance with variation of the distance from the magnet to the bearing. In FIG. 9, when "-" is described in the column of the distance, the mechanical load ML2 in the motor of the reference example not including the balance members 6*a*, 6*b* and a ratio TR of torque of the motor 10 and torque of the motor of the reference example are described. In the present disclosure, a mechanical load ML is measured when respective ratios RB1, RB2 of the distance B2 to the air gap AG are from a state that the magnet 3 and the balance members 6*a*, 6*b* are contacted ("0" in FIG. 9) to 3.5.

According to FIGS. 9 and 10, it is found that the mechanical load ML of the motor 10 is significantly decreased, especially when the respective ratios RB1, RB2 of the distance B2 between the magnet 3 and the balance members 6*a*, 6*b* are 1.5 to 2.8 compared to a mechanical load ML2 in the motor of the reference example. That is, in the present embodiment, it is found that the efficiency of the motor 10 is improved in a case where the respective ratios RB1, RB2 of the distance between the magnet 3 and the balance members 6*a*, 6*b* to the air gap AG are 1.5 to 2.8 compared to the cases before and after this case.

Also, according to FIGS. 9 and 10, it is found that, in the motor 10, a ratio TR of torque of the motor 10 to torque of the reference example is 1.0 or more in a region that respective ratios RB1, RB2 of the distance between the magnet 3 and the balance members 6*a*, 6*b* to the air gap AG is 1.5 or more. That is, it is found that the motor 10 generates torque which is larger than torque of the motor of the reference example in a region that the respective ratios RB1, RB2 of the distance between the magnet 3 and the balance members 6*a*, 6*b* to the air gap AG are 1.5 or more.

According to FIGS. 7 to 10, it is found that the mechanical load ML is decreased and torque which is larger than torque of the motor of the reference example can be generated in a case where the respective ratios RB1, RB2 of the distance between the magnet 3 and the balance members 6*a*, 6*b* to the air gap AG are 1.5 to 2.8 in the motor 10. Consequently, in the motor 10, it can be said as preferable to set the respective ratios RB1, RB2 of the distance between the magnet 3 and the balance members 6*a*, 6*b* to the air gap AG to 1.5 to 2.8.

As explained above, according to the motor 10, a rapid rotation can be achieved.

As described above, the embodiment of the present disclosure has been explained. However, the present disclosure is not limited to the motor 10 according to the embodiment of the present disclosure, and includes all aspects included in the concept of the present disclosure and the claims. Also, to solve or provide at least part of the above-described problems or effects, each configuration can be selectively assembled as needed. For example, in the above embodiment, the shape, the material, the arrangement and the size, etc. of each configuration can be appropriately varied depending to a concrete usage aspect of the present disclosure.

What is claimed is:

1. A motor comprising:
    a shaft;
    a first bearing and a second bearing supporting the shaft;
    a magnet supported by the shaft between the first bearing and the second bearing;
    a stator surrounding the magnet; and
    a first magnetic member arranged between the magnet and the first bearing in a longitudinal direction of the shaft, and
    a second magnetic member arranged between the magnet and the second bearing in a longitudinal direction of the shaft,
    wherein the first bearing and the second bearing being made of metal with magnetic property,
    the first magnetic member has a larger outer diameter with respect to an outer diameter of the magnet, and
    the first magnetic member being attached to the shaft,
    the second magnetic member has a larger diameter with respect to an outer diameter of the magnet and a smaller outer diameter with respect to an outer diameter of the second bearing,
    the second magnetic member being attached to the shaft.

2. The motor according to claim 1, wherein the first magnetic member and the second magnetic member serve as a path allowing passage of magnetic flux.

3. The motor according to claim 1, wherein the first magnetic member is separated from the first bearing and the magnet, by a predetermined distance in the longitudinal direction of the shaft.

4. The motor according to claim 3, wherein, in the longitudinal direction of the shaft, a distance between the first bearing and the first magnetic member is shorter than a distance between the first magnetic member and the magnet.

5. The motor according to claim 1, comprising a rotor including the shaft and the magnet, wherein the first magnetic member is a balance member of the rotor.

6. The motor according to claim 5, wherein, in the longitudinal direction of the shaft, the first magnetic member includes a surface portion facing the first bearing, and a recessed part, a hole portion or a protruding part is provided at a surface portion facing the first bearing.

7. The motor according to claim 5, wherein, in the longitudinal direction of the shaft, a distance between the magnet and the first magnetic member is longer than a distance of an air gap.

8. The motor according to claim 1, comprising a plurality of bearings including the first bearing and second bearing, wherein the first magnetic member is provided for the plurality of bearings.

9. A motor comprising:
    a shaft;
    a first bearing and a second bearing supporting the shaft;
    a magnet supported by the shaft between the first bearing and the second bearing;
    a stator surrounding the magnet; and
    a first magnetic member arranged between the magnet and the first bearing in a longitudinal direction of the shaft,
    a second magnetic member arranged between the magnet and the second bearing in a longitudinal direction of the shaft,
    a case housing a rotor,
    wherein the first bearing and the second bearing being made of metal with magnetic property,
    the first magnetic member and the second magnetic member are attached to the shaft,
    a size of an outer peripheral surface of the first magnetic member and a size of an outer peripheral surface of the second magnetic member are both relatively smaller with respect to a size of an inner peripheral surface of the stator in a radial direction of the shaft, the first magnetic member or the second magnetic member faces an inner peripheral surface of the case in the radial direction.

10. The motor according to claim 9, wherein the first magnetic member serves as a path allowing passage of magnetic flux.

11. The motor according to claim 9, wherein the size of the outer peripheral surface of the first magnetic member is relatively smaller with respect to a size of the first bearing in the radial direction of the shaft, the size of the outer peripheral surface of the second magnetic member is relatively smaller with respect to the size of the second bearing in the radial direction of the shaft.

12. The motor according to claim 9, wherein the first magnetic member is separated from the first bearing and the magnet, by a predetermined distance in the longitudinal direction of the shaft.

13. The motor according to claim 9, wherein the second magnetic member is separated from the second bearing and the magnet, by a predetermined distance in the longitudinal direction of the shaft.

14. The motor according to claim 12, wherein, in the longitudinal direction of the shaft, a distance between the first bearing and the first magnetic member is shorter than a distance between the first magnetic member and the magnet.

15. The motor according to claim 13, wherein, in the longitudinal direction of the shaft, a distance between the second bearing and the second magnetic member is shorter than a distance between the second magnetic member and the magnet.

16. The motor according to claim 9, the rotor including the shaft and the magnet, wherein the first magnetic member is a balance member of the rotor.

17. The motor according to claim 16, wherein the second magnetic member is a balance member of the rotor.

18. A motor comprising:
a shaft;
a first bearing and a second bearing supporting the shaft;
a magnet supported by the shaft between the first bearing and the second bearing;
a stator surrounding the magnet; and
a first magnetic member arranged between the magnet and the first bearing in a longitudinal direction of the shaft,
a second magnetic member arranged between the magnet and the second bearing in a longitudinal direction of the shaft,
a case housing a rotor,
the first magnetic member and the second magnetic member are attached to the shaft,
a size of an outer peripheral surface of the first magnetic member and a size of an outer peripheral surface of the second magnetic member are both relatively smaller with respect to a size of an inner peripheral surface of the stator in a radial direction of the shaft,
the first magnetic member or the second magnetic member faces an inner peripheral surface of the case in the radial direction.

19. The motor according to claim 18, wherein the size of the outer peripheral surface of the first magnetic member is relatively smaller with respect to a size of the first bearing in the radial direction of the shaft, the size of the outer peripheral surface of the second magnetic member is relatively smaller with respect to the size of the second bearing in the radial direction of the shaft.

\* \* \* \* \*